(12) United States Patent
Kawahara

(10) Patent No.: US 9,915,329 B2
(45) Date of Patent: Mar. 13, 2018

(54) POWER TRANSMISSION DEVICE AND LOCK-UP DEVICE FOR TORQUE CONVERTER

(71) Applicant: EXEDY Corporation, Neyagawa-shi, Osaka (JP)

(72) Inventor: Yuki Kawahara, Neyagawa (JP)

(73) Assignee: EXEDY Corporation, Osaka (JP)

( * ) Notice: Subject to any disclaimer, the term of this patent is extended or adjusted under 35 U.S.C. 154(b) by 460 days.

(21) Appl. No.: 14/678,516

(22) Filed: Apr. 3, 2015

(65) Prior Publication Data

US 2015/0362053 A1    Dec. 17, 2015

(30) Foreign Application Priority Data

Jun. 16, 2014    (JP) ................................. 2014-123181

(51) Int. Cl.
*F16H 45/02*    (2006.01)
*F16F 15/14*    (2006.01)
(Continued)

(52) U.S. Cl.
CPC ......... *F16H 45/02* (2013.01); *F16F 15/1457* (2013.01); *F16D 3/12* (2013.01);
(Continued)

(58) Field of Classification Search
CPC ............. F16H 45/02; F16H 2045/0205; F16H 2045/0221; F16H 2045/0226;
(Continued)

(56) References Cited

U.S. PATENT DOCUMENTS 8,135,525 B2     3/2012  Swank et al.
2010/0242466 A1*  9/2010  Krause .................. F16F 15/145
                                                           60/327
(Continued)

FOREIGN PATENT DOCUMENTS

JP         2009-115262 A    5/2009
JP         2009-293671 A    12/2009
(Continued)

OTHER PUBLICATIONS

Office Action of the corresponding Japanese Patent Application No. 2014-123181, dated Sep. 26, 2017.

*Primary Examiner* — Richard M Lorence
(74) *Attorney, Agent, or Firm* — Global IP Counselors, LLP

(57) ABSTRACT

The power transmission device transmits power from an engine to a transmission and includes an input-side rotary member, an output-side rotary member, a first elastic member, a float member and a damper device. The input-side rotary member receives the power inputted thereto from the engine. The output-side rotary member outputs the power to the transmission. The first elastic member couples the input-side rotary member and the output-side rotary member to enable relative rotation therebetween. The float member is rotatable relative to the input-side rotary member, the output-side rotary member and the first elastic member and is configured to slide against the first elastic member when rotated. The damper device is mounted to the float member and includes an inertia member that is rotatable relative to the float member.

12 Claims, 11 Drawing Sheets

(51) Int. Cl.
*F16D 3/12* (2006.01)
*F16D 25/0635* (2006.01)

(52) U.S. Cl.
CPC .. *F16D 25/0635* (2013.01); *F16H 2045/0205* (2013.01); *F16H 2045/0226* (2013.01); *F16H 2045/0263* (2013.01); *F16H 2045/0278* (2013.01); *F16H 2045/0294* (2013.01)

(58) Field of Classification Search
CPC ..... F16H 2045/0231; F16H 2045/0263; F16H 2045/0278; F16H 2045/0294; F16F 15/14–15/1457
See application file for complete search history.

(56) References Cited

U.S. PATENT DOCUMENTS

| | | | | |
|---|---|---|---|---|
| 2011/0031083 A1* | 2/2011 | Matsuoka | ............... | F16H 45/02 192/3.29 |
| 2011/0099992 A1* | 5/2011 | Magerkurth | .......... | F16F 15/145 60/435 |
| 2016/0116020 A1* | 4/2016 | Tomiyama | .............. | F16H 45/02 192/3.28 |
| 2016/0169358 A1* | 6/2016 | Kawahara | ........... | F16F 15/1421 192/3.28 |

FOREIGN PATENT DOCUMENTS

| | | |
|---|---|---|
| JP | 2012-087856 A | 5/2012 |
| JP | 2012-167755 A | 9/2012 |
| JP | 2013-506100 A | 2/2013 |
| JP | 2014-070647 A | 4/2014 |

\* cited by examiner

POWER TRANSMISSION DEVICE AND LOCK-UP DEVICE FOR TORQUE CONVERTER

CROSS-REFERENCE TO RELATED APPLICATIONS

This application claims priority under 35 U.S.C. § 119(a) to Japanese Patent Application No. 2014-123181 filed on Jun. 16, 2014, the entirety of which is hereby incorporated by reference.

BACKGROUND

Field of the Invention

The present invention relates to a power transmission device, particularly to a power transmission device for transmitting power from an engine to a transmission. Further, the present invention relates to a lock-up device, particularly to a lock-up device that is disposed between a torque converter body and a front cover coupled to an engine-side member to directly transmit power from the front cover to a turbine of the torque converter body.

Background Information

A torque converter is provided with a lock-up device to reduce fuel consumption. The lock-up device is disposed between a front cover and a turbine, and is configured to mechanically couple the front cover and the turbine to directly transmit torque therebetween.

The lock-up device includes a piston and a damper device as described in, for instance, Japan Laid-open Patent Application Publication No. JP-A-2009-293671. A friction member is fixed to the piston. The piston is configured to be moved by the action of hydraulic pressure, and accordingly, the friction member is configured to be pressed onto the front cover. Thus, torque is transmitted from the front cover to the piston. The damper device includes a plurality of outer peripheral side torsion springs, a plurality of inner peripheral side torsion springs and an intermediate member for coupling the outer peripheral side torsion springs and the inner peripheral side torsion springs. Further, the piston and an output-side member coupled to the turbine are elastically coupled by the torsion springs.

Moreover, as described in U.S. Pat. No. 8,135,525, there has been also provided a lock-up device intended to inhibit variation in speed of rotation to be transmitted to the output side by mounting an inertia member to the intermediate member for coupling the outer peripheral side torsion springs and the inner peripheral side torsion springs.

The lock-up device of U.S. Pat. No. 8,135,525 has the construction that the inertia member of the turbine and the elastic members are coupled to the intermediate member, and thus can inhibit variation in speed of rotation to be transmitted from the engine to the transmission in comparison with the device of the Publication No. JP-A-2009-293671.

However, the device of U.S. Pat. No. 8,135,525 has a drawback that the inertia member of the turbine resonates with variation in rotation speed of the engine, and this causes large variation in speed of rotation to be transmitted to the transmission when the rotation speed of the engine is low.

SUMMARY

It is an object of the present invention to effectively inhibit variation in speed of rotation to be transmitted to a transmission in a power transmission device, such as a lock-up device for a torque converter.

A power transmission device according to an aspect of the present invention is a device for transmitting power from an engine to a transmission. The present power transmission device includes an input-side rotary member, an output-side rotary member, a first elastic member, a float member and a damper device. The input-side rotary member receives the power inputted thereto from the engine. The output-side rotary member outputs the power to the transmission. The first elastic member couples the input-side rotary member and the output-side rotary member to enable relative rotation between the input-side rotary member and the output-side rotary member. The float member is rotatable relatively to the input-side rotary member, the output-side rotary member and the first elastic member, and is configured to slide against the first elastic member when rotated. The damper device is mounted to the float member and includes an inertia member that is rotatable relative to the float member.

In the present power transmission device, the power inputted into the input-side rotary member is transmitted to the output-side rotary member through the first elastic member. At this time, variation in speed of rotation to be transmitted to the transmission side is inhibited by the action of the first elastic member. When the first elastic member is herein activated, the float member is configured to slide against the first elastic member. Thus, the float member is configured to be dragged and rotated by the first elastic member. With respect to the movement of the float member, the inertia member of the damper device acts in a direction of inhibiting variation in rotation. Variation in speed of rotation can be thereby further inhibited.

In the present power transmission device, the damper device including the inertia member is mounted to the float member that is freely rotatable with respect to the first elastic member. The float member is not engaged with the first elastic member. Thus, resonance of the damper device does not occur in the present power transmission device unlike a well-known device. Variation in speed of rotation can be thereby further inhibited especially in a low rotation speed range.

Further, the first elastic member and the float member are rotatable relative to each other. Hence, the magnitude of hysteresis torque herein becomes quite smaller than that of the well-known device, and a damper function can be herein more effectively exerted than the well-known device.

In a power transmission device according to another aspect of the present invention, the first elastic member is a coil spring extending rotation-directionally. Further, the float member is contactable to an outer peripheral part of the coil spring and restricts radial movement of the coil spring. With the construction, friction force is generated between the coil spring and the float member. Thus, the damper device can be effectively activated.

In a power transmission device according to yet another aspect of the present invention, the damper device includes a base plate, the inertia member and a damper. The base plate is fixed to the float member. The inertia member is disposed to be rotatable relative to the base plate. The damper couples the base plate and the inertia member.

In a power transmission device according to yet another aspect of the present invention, the base plate has an annular shape. Further, the inertia member includes first and second inertia rings disposed on axially both sides of the base plate. Yet further, the damper includes a coil spring rotation-directionally and elastically coupling the base plate and both of the first and second inertia rings. With the construction, hysteresis torque can be reduced in the damper device.

In a power transmission device according to yet another aspect of the present invention, the first elastic member is a coil spring having a circular-arc shape in a free state. With the construction, an appropriate magnitude of friction force is generated between the coil spring and the float member. Thus, the damper device can be effectively activated.

A power transmission device according to yet another aspect of the present invention further includes either or both of second and third elastic members disposed in series with the first elastic member on either or both of input and output sides of the first elastic member. With the construction, a rotation speed range in which vibrations are reducible can be shifted to a lower rotation speed.

A power transmission device according to yet another aspect of the present invention further includes a friction generating mechanism. The friction generating mechanism is disposed at least either between the float member and the input-side rotary member or between the float member and the output-side rotary member to generate friction resistance therebetween. With the construction, the damper device can be effectively activated.

A power transmission device according to yet another aspect of the present invention further includes a stopper mechanism for restricting rotation-directional movement of the float member to a predetermined range. With the construction, imbalance of the output member can be inhibited.

In a power transmission device according to yet another aspect of the present invention, the first elastic member includes a plurality of outer peripheral side torsion springs engaging with the input-side rotary member. The power transmission device further includes a plurality of inner peripheral side torsion springs and an intermediate member. The inner peripheral side torsion springs are disposed on an inner peripheral side of the outer peripheral side torsion springs and are engaged with the output-side rotary member. The intermediate member is disposed to be rotatable relative to the input-side rotary member and the output-side rotary member, and couples the outer peripheral side torsion springs and the inner peripheral side torsion springs. With the construction, the magnitude of torsional stiffness of the device can be reduced without enlarging the axial space of the device.

A lock-up device for a torque converter according to further yet another aspect of the present invention is disposed between a torque converter body and a front cover coupled to an engine-side member to directly transmit power from the front cover to a turbine of the torque converter body. The lock-up device includes a clutch portion, an output flange, a plurality of elastic members, a float member and a damper device.

The clutch portion is configured to transmit the power from the front cover. The output flange is coupled to the turbine. The elastic members are configured to transmit the power from the clutch portion to the output flange. The float member is rotatable relative to the clutch portion, the output flange and the elastic members. Further, the float member is configured to slide against the elastic members when rotated, and also, restricts radial movement of the elastic members. The damper device is mounted to the float member, and includes an inertia member that is rotatable relative to the float member.

Overall, according to the present invention as described above, it is possible to effectively inhibit variation in speed of rotation to be transmitted to a transmission in a power transmission device equipped with a damper device.

BRIEF DESCRIPTION OF THE DRAWINGS

Referring now to the attached drawings which form a part of this original disclosure.

DETAILED DESCRIPTION OF EXEMPLARY EMBODIMENTS

First Preferred Embodiment

Figure 1:
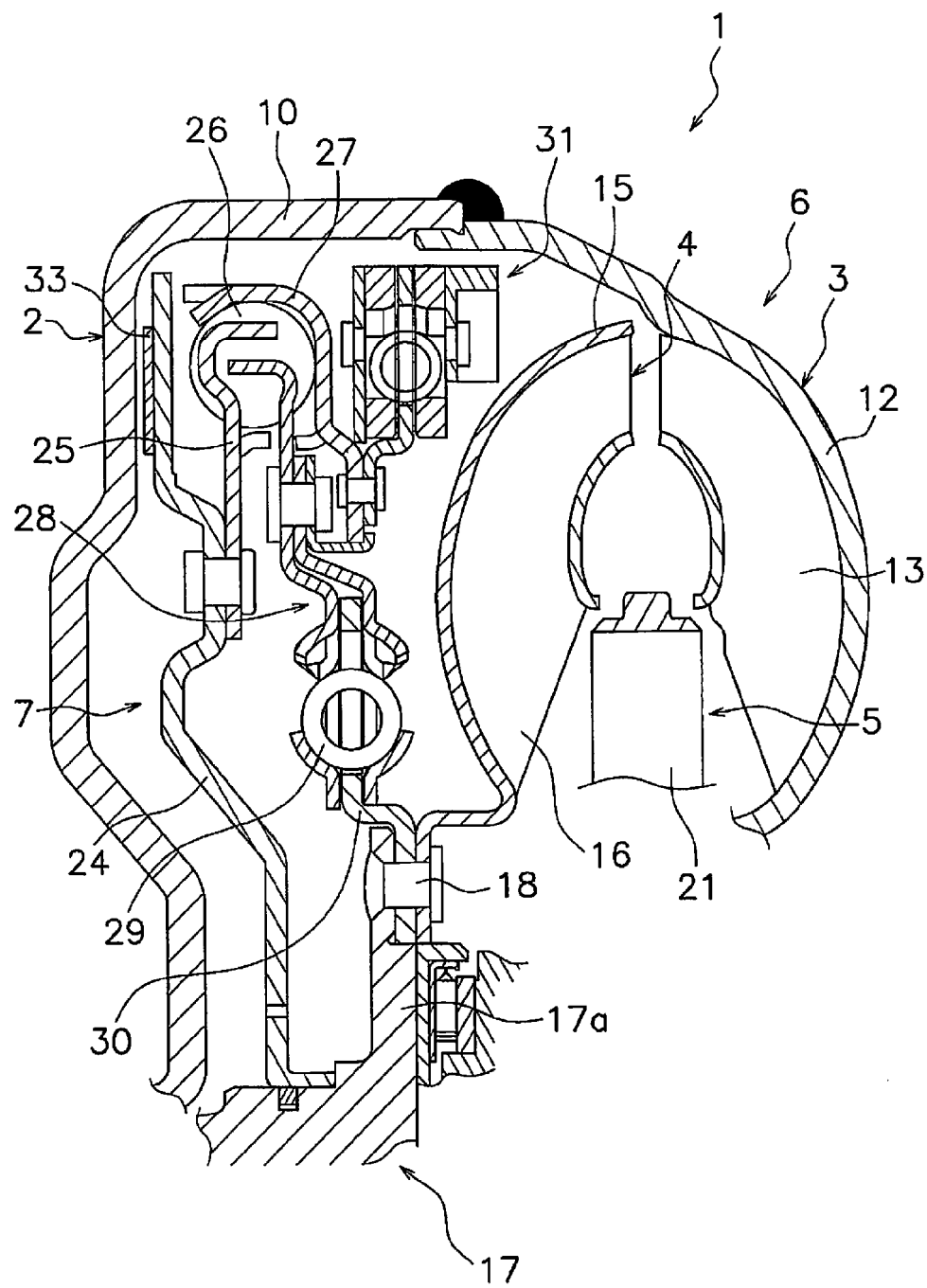
FIG. 1 is a cross-sectional view of a construction of a torque converter equipped with a lock-up device according to a first exemplary embodiment of the present invention.

FIG. 1 is a partial cross-sectional view of a torque converter 1 equipped with a lock-up device according to a first exemplary embodiment of the present invention. In FIG. 1, an engine (not shown in the drawings) is disposed on the left side, whereas a transmission (not shown in the drawings) is disposed on the right side.

Entire Construction of Torque Converter 1

The torque converter 1 is a device for transmitting torque from a crankshaft (not shown in the drawings) of the engine to an input shaft of the transmission. The torque converter 1 includes a front cover 2 fixed to an input-side member, a torque converter body 6 composed of three types of vane wheels (an impeller 3, a turbine 4 and a stator 5), and a lock-up device 7.

The front cover 2 is a disc-shaped member and has an outer peripheral tubular part 10 as the outer peripheral part thereof. The outer peripheral tubular part 10 protrudes toward the transmission. The impeller 3 is composed of an impeller shell 12, a plurality of impeller blades 13 and an impeller hub (not shown in the drawings). The impeller shell 12 is fixed to the outer peripheral tubular part 10 of the front cover 2 by welding. The impeller blades 13 are fixed to the inside of the impeller shell 12. The impeller hub is a tubular member disposed on the inner peripheral side of the impeller shell 12.

The turbine 4 is disposed inside a fluid chamber to be opposed to the impeller 3. The turbine 4 is composed of a turbine shell 15, a plurality of turbine blades 16 and a turbine hub 17. The turbine blades 16 are fixed to the turbine shell 15. The turbine hub 17 is fixed to the inner peripheral part of the turbine shell 15. The turbine hub 17 has a flange 17a extending to the outer peripheral side. The inner peripheral part of the turbine shell 15 is fixed to the flange 17a by a plurality of rivets 18. Further, the input shaft (not shown in the drawings) of the transmission is spline-coupled to the inner peripheral part of the turbine hub 17.

The stator 5 is a mechanism for regulating the flow of operating oil returning from the turbine 4 to the impeller 3. The stator 5 is disposed between the inner peripheral part of the impeller 3 and that of the turbine 4. The stator 5 includes a stator carrier and a plurality of stator blades 21 mounted to the outer peripheral surface of the stator carrier. The stator carrier is supported by a stationary shaft through a one-way clutch.

Entire Construction of Lock-up Device 7

Figure 2:
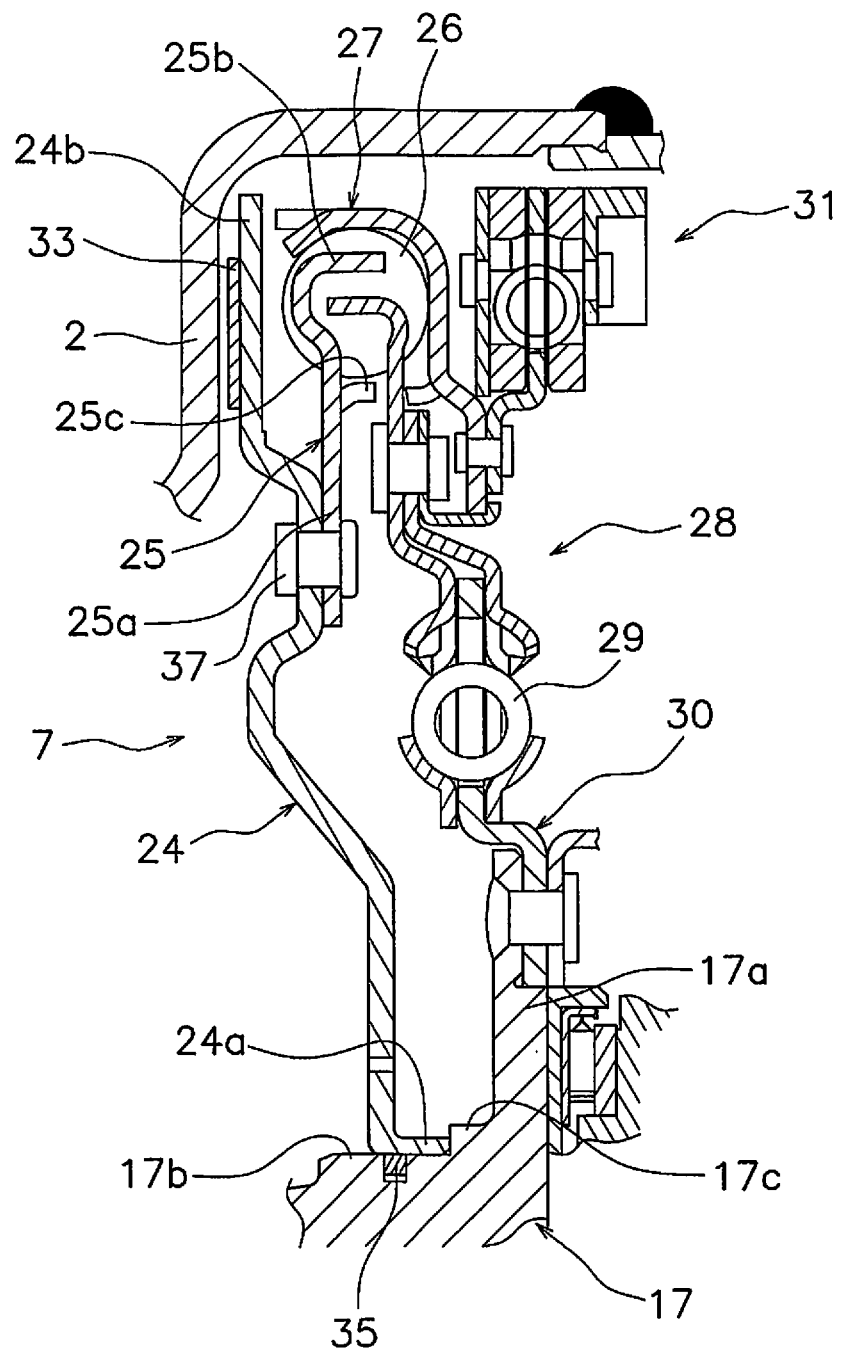
FIG. 2 is an enlarged view of the lock-up device of FIG. 1.

FIG. 2 shows the lock-up device 7 extracted from FIG. 1. The lock-up device 7 is disposed in a space produced between the front cover 2 and the turbine 4. The lock-up device 7 includes a piston 24, a drive plate 25, outer peripheral side torsion springs (first elastic members) 26, a float member 27, an intermediate member 28, inner peripheral side torsion springs 29, a hub flange 30 as an output-side rotary member and a dynamic damper device (damper device) 31.

It should be noted that the piston 24 and the drive plate 25 compose an input-side rotary member.

Piston 24

The piston 24 is a disc-shaped plate and is disposed on the transmission side of the front cover 2. The piston 24 has a tubular part 24a on the inner peripheral end thereof. The tubular part 24a extends therefrom toward the transmission. The tubular part 24a is supported by the outer peripheral surface of the turbine hub 17 to be axially movable and rotatable relative to the turbine hub 17. Further, the piston 24 has a flat part 24b as the outer peripheral part thereof. An annular friction member 33 is fixed to the-front-cover-2 side surface of the flat part 24b. When the friction member 33 is pressed onto the front cover 2, torque is configured to be transmitted from the front cover 2 to the piston 24. The piston 24 and the friction member 33 compose a clutch portion.

It should be noted that the turbine hub 17 has a stepped part on the outer peripheral surface thereof. The stepped part is composed of a small diameter part 17b as an engine-side part and a large diameter part 17c as a transmission-side part. The piston 24 is supported by the small diameter part 17b. A seal member 35 is mounted to the small diameter part 17b. Thus, the seal member 35 seals between the turbine hub 17 and the inner peripheral surface of the piston 24. Further, the tip end of the tubular part 24a contacts the lateral surface of the large diameter part 17c. The piston 24 is thereby restricted from axially moving toward the transmission.

Drive Plate 25

The drive plate 25 is fixed to the transmission-side lateral surface of the outer peripheral part of the piston 24. Specifically, the drive plate 25 has a disc shape and an inner peripheral part 25a thereof is fixed to the transmission-side surface of the piston 24 by rivets 37. The drive plate 25 has a plurality of engaging parts 25b in the outer peripheral part thereof. The engaging parts 25b are formed by bending the outer peripheral end of the drive plate 25 to the transmission side. The engaging parts 25b are engaged with both of the circumferential ends of the respective outer peripheral side torsion springs 26. Further, the drive plate 25 has a plurality of spring support parts 25c in the radial intermediate part thereof. The spring support parts 25c protrude therefrom toward the transmission. The spring support parts 25c are circumferentially aligned at predetermined intervals. The respective spring support parts 25c support the outer peripheral side torsion springs 26 from the inner peripheral side in the radial direction of the drive plate 25.

Outer Peripheral Torsion Springs 26 and Float Member 27

Each outer peripheral side torsion spring 26 has a circular-arc shape bulging to the outer peripheral side in a free state, i.e., a stand-alone state before installation in the lock-up device 7.

Figure 3:
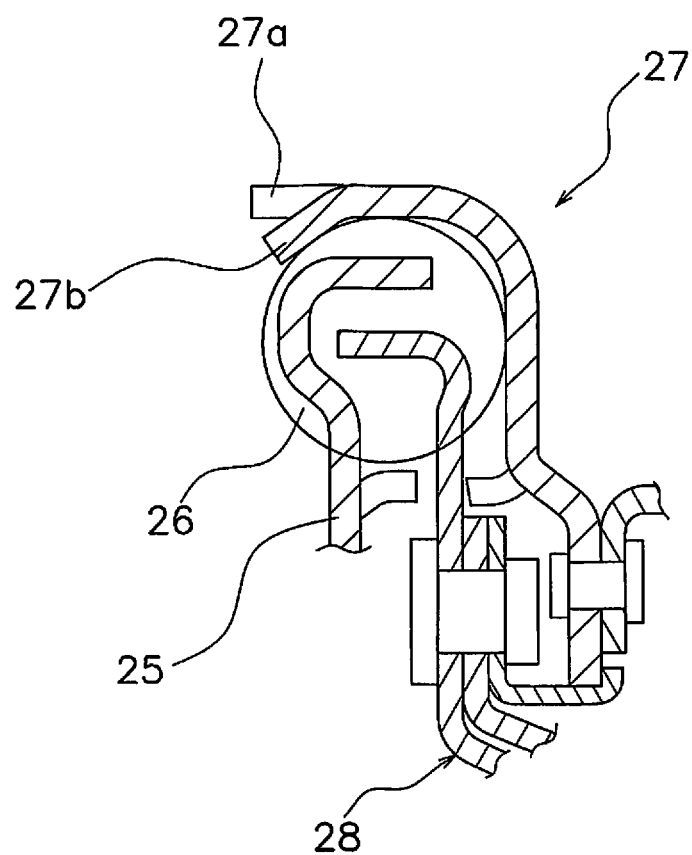
FIG. 3 is an enlarged view of a float member of FIG. 1.

As shown in an enlarged view of FIG. 3, the float member 27 is an annular plate member. The float member 27 has a tubular part 27a formed by bending the outer peripheral part thereof toward the front cover 2. Further, the tubular part 27a has a plurality of spring accommodation parts 27b. The spring accommodation parts 27b are circumferentially aligned at predetermined intervals. The spring accommodation parts 27b are formed by bending the front-cover-2 side tip end of the tubular part 27a to the inside in the radial direction of the float member 27. The spring accommodation parts 27b accommodate the outer peripheral side torsion springs 26.

The float member 27 is freely rotatable with respect to another member, i.e., the drive plate 25 or both of the intermediate member 28 and the hub flange 30. Further, the spring accommodation parts 27b and the outer peripheral side torsion springs 26 are not engaged. Hence, the float member 27 is also not rotated in synchronization with the outer peripheral side torsion springs 26.

When the outer peripheral side torsion springs 26 are compressed and deform to bulge to the outer peripheral side of the torque converter 1 due to centrifugal force, the outer peripheral parts of the outer peripheral side torsion springs 26 slide against the inner peripheral walls of the spring accommodation parts 27b. Frictional resistance is herein generated between the outer peripheral side torsion springs 26 and the float member 27. Thus, the float member 27 is to be dragged and rotated by the outer peripheral side torsion springs 26.

Intermediate Member 28

Figure 4:
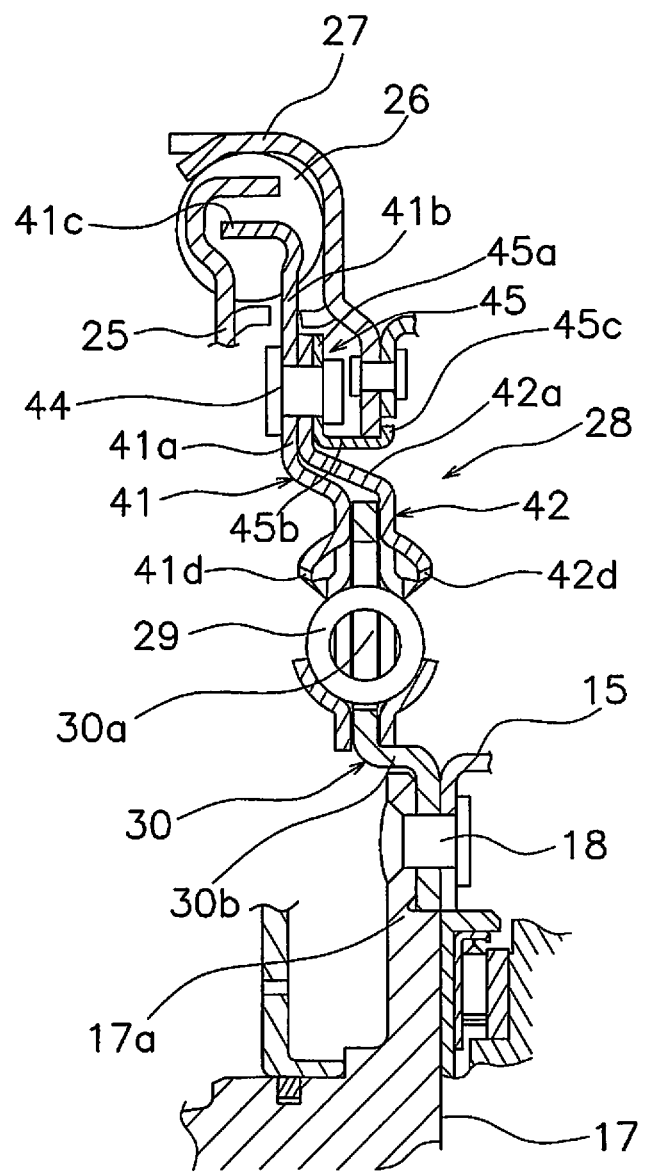
FIG. 4 is an enlarged view of an intermediate member and a hub flange of FIG. 1.

FIG. 4 shows the intermediate member 28, the inner peripheral side torsion springs 29 and the hub flange 30, which are extracted from FIG. 1. The intermediate member 28 is disposed for coupling the outer peripheral side torsion springs 26 and the inner peripheral side torsion springs 29 to cause the outer peripheral side torsion springs 26 and the inner peripheral side torsion springs 29 to act in series. The intermediate member 28 also has a function of holding the inner peripheral side torsion springs 29. The intermediate member 28 is composed of a first plate 41 and a second plate 42, and is rotatable relatively to the drive plate 25 and the hub flange 30.

The first and second plates 41 and 42 are annular disc-shaped members disposed between the piston 24 and the turbine shell 15. The first plate 41 and the second plate 42 are disposed at an interval in the axial direction except for the outer peripheral parts thereof. The first plate 41 is disposed on the engine side, whereas the second plate 42 is disposed on the transmission side.

The first plate 41 has a disc-shaped body 41a and a plurality of protruding parts 41b protruding from the body 41a to the outer peripheral side. The protruding parts 41b are circumferentially aligned at predetermined intervals. The protruding parts 41b have lock parts 41c on the tip ends (the outer peripheral ends) thereof. The lock parts 41c extend to the outer peripheral side torsion springs 26. The lock parts 41c are formed by bending the tip ends of the protruding parts 41b to the axially engine side. Further, each outer peripheral side torsion spring 26 is disposed between adjacent two of the lock parts 41c.

The second plate 42 has a disc-shaped body 42a. The outer peripheral part of the body 42a makes contact with the body 41a of the first plate 41. Further, the first plate 41 and the second plate 42 are fixed at their contacted parts by a plurality of rivets 44. Therefore, the first plate 41 and the second plate 42 are coupled to be axially immovable and non-rotatable relative to each other.

Further, each of the first and second plates 41 and 42 has a plurality of window parts 41d, 42d axially penetrating therethrough. Each window part 41d, 42d has a circumferentially extending shape and has cut-and-raised parts. The cut-and-raised parts are formed by axially cutting and raising the inner and outer peripheral parts (i.e., the radially inner and outer parts) of each window part 41d, 42d. Each inner peripheral side torsion spring 29 is disposed inside each pair of matched window parts 41d and 42d of the both plates 41 and 42. Further, the both circumferential ends and the both radial ends of each inner peripheral side torsion spring 29 are supported by each pair of matched window parts 41d and 42d. Yet further, each inner peripheral side torsion spring 29 is restricted from radially and axially jumping out therefrom by the cut-and-raised parts of the window parts 41d and 42d.

A support member 45 is fixed to the outer peripheral part of the intermediate member 28 to support the float member 27. As shown in FIG. 4, the support member 45 is an annular member having an L-shaped cross-section. The support member 45 has a flat part 45a extending in the radial direction. The flat part 45a is fixed to the first and second plates 41 and 42 by the rivets 44. The support member 45 further has a tubular part 45b and a restriction part 45c. The tubular part 45b extends in the axial direction. The restriction part 45c is formed on the tip end of the tubular part 45b to bend to the outer peripheral side. The inner peripheral end surface of the float member 27 herein makes contact with the outer peripheral surface of the tubular part 45b. Further, the inner peripheral end of the float member 27 makes contact with the front-cover-2 side surface of the restriction part 45c.

With the construction as described above, the float member 27 is radially and axially supported with respect to the intermediate member 28.

Hub Flange 30

As shown in FIG. 4 and so forth, the hub flange 30 is an annular disc-shaped member, and the inner peripheral part thereof is fixed together with the turbine shell 15 to the flange 17a of the turbine hub 17 by the rivets 18. The hub flange 30 is disposed axially between the first plate 41 and the second plate 42 to be rotatable relative to both plates 41 and 42. Further, the hub flange 30 has window holes 30a in the outer peripheral part thereof. The window holes 30a are bored therein to be matched with the window parts 41d and 42d of the first and second plates 41 and 42. The window holes 30a axially penetrate through the hub flange 30, and accommodate the inner peripheral side torsion springs 29.

The hub flange 30 has a tubular part 30b axially extending in the radially intermediate part thereof. The inner peripheral end surface of the second plate 42 contacts the outer peripheral surface of the tubular part 30b. Thus, the intermediate member 28, the float member 27 and the dynamic damper device 31 are positioned in the radial direction.

Dynamic Damper Device 31

Figure 5:
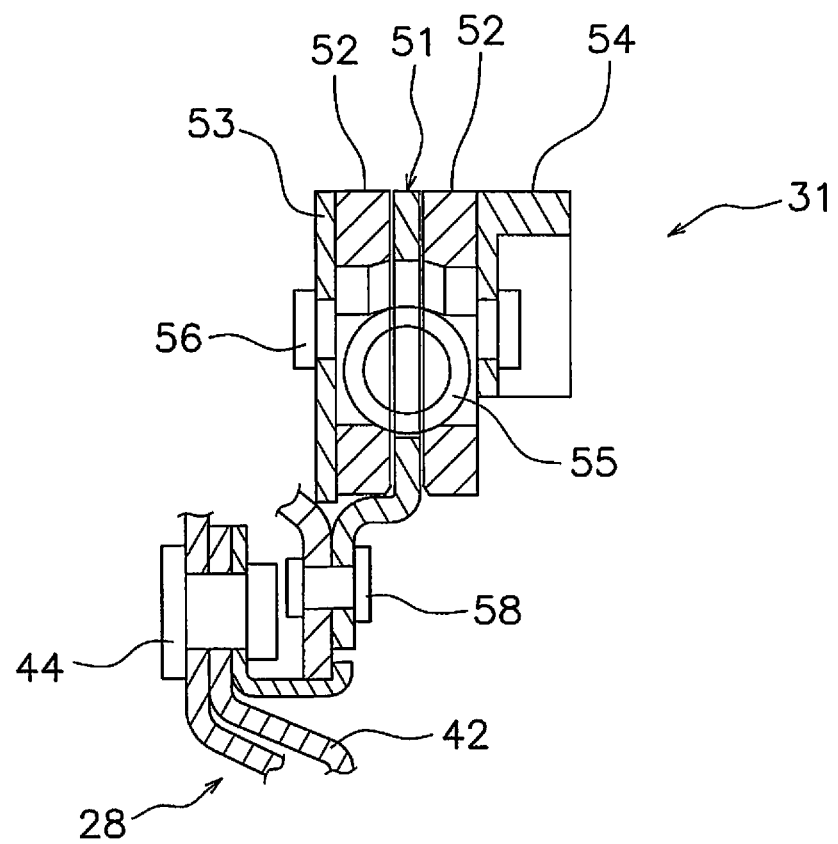
FIG. 5 is a cross-sectional view of a construction of a dynamic damper device of FIG. 1.

The dynamic damper device 31 is mounted to the float member 27. As shown in FIG. 5, the dynamic damper device 31 includes a base plate 51, a pair of inertia rings 52, a first lid member 53, a second lid member 54, a plurality of coil springs 55 and a plurality of stop pins 56.

Base Plate 51

Figure 6:
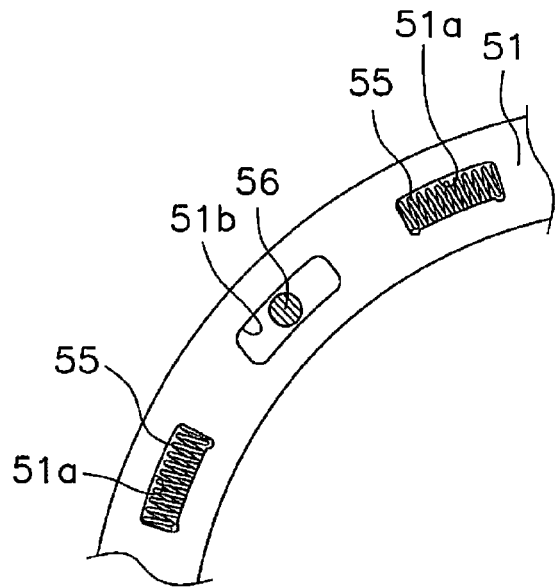
FIG. 6 is a partial front view of a base plate of the dynamic damper device.

The base plate 51 has an annular shape, and the inner peripheral part thereof is fixed to the inner peripheral end of the float member 27 by a plurality of rivets 58. As shown in FIG. 6, the base plate 51 has a plurality of spring accommodation parts 51a circumferentially aligned at predetermined intervals. The spring accommodation parts 51a respectively have a predetermined circumferential length. A plurality of elongated holes 51b are formed circumferentially among the spring accommodation parts 51a. The elongated holes 51b respectively have a predetermined circumferential length, and are formed on the circumferential line on which the spring accommodation parts 51a are formed.

Inertia Rings 52

Figure 7:
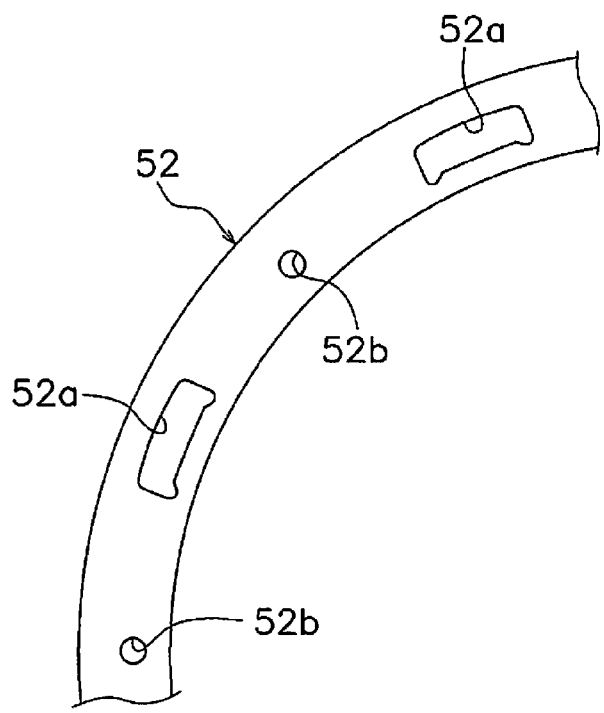
FIG. 7 is a partial front view of an inertia ring of the dynamic damper device.

One pair of inertia rings 52 is formed by stamping of sheet metal, and is disposed axially on the both sides of the base plate 51. The two inertia rings 52 have the same construction. As shown in FIG. 7, each inertia ring 52 has a plurality of spring accommodation parts 52a circumferentially aligned at predetermined intervals. The spring accommodation parts 52a are formed in matched positions with the spring accommodation parts 51a of the base plate 51. Each inertia ring 52 further has through holes 52b, and each through hole 52b is formed in a matched position with the circumferential middle of each elongated hole 51b of the base plate 51.

First Lid Member 53

The first lid member 53 is disposed on the further engine side of the engine-side inertia ring 52. As shown in an enlarged view of FIG. 8, the first lid member 53 has through holes 53b bored in matched positions with the through holes 52b of the inertia rings 52.

Second Lid Member 54

The second lid member 54 is disposed on the further transmission side of the transmission-side inertia ring 52.

The second lid member 54 is an annular member, and the axial thickness thereof is larger than that of each inertia ring 52 and that of the first lid member 53. The second lid member 54 herein has the aforementioned shape (i.e., settings of the inner diameter and the thickness) for the purpose of avoiding physical interference with the turbine shell 15 and also increasing the inertia amount. The second lid member 54 has through holes 54b bored in matched positions with the through holes 52b of each inertia ring 52. The second lid member 54 further has recesses 54c for swaging. The recesses 54c are formed on the axially outside ends of the through holes 54b. Each recess 54c has a diameter larger than that of each through hole 54b. As is obvious from FIG. 8, the recesses 54c open inwardly in the radial direction of the second lid member 54.

Coil Springs 55

The plural coil springs 55 are respectively accommodated in the spring accommodation parts 51a of the base plate 51 and the spring accommodation parts 52a of the inertia rings 52. Further, the both ends of each coil spring 55 contact the circumferential ends of each spring accommodation part 51a of the base plate 51 and those of each pair of the spring accommodation parts 52a of the inertia rings 52.

Stop Pins 56

Figure 8:
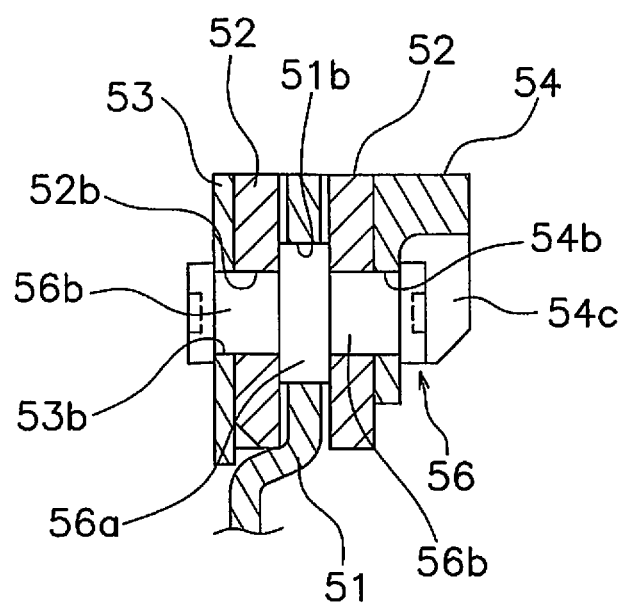
FIG. 8 is a view of a stop pin of the dynamic damper device.

As shown in FIG. 8, each stop pin 56 has a large diameter trunk 56a in the axially middle part thereof and small diameter trunks 56b on the both sides of the large diameter trunk 56a.

The diameter of the large diameter trunk 56a is larger than the diameters of the through holes 52b of the inertia rings 52, but is smaller than the diameter (radial dimension) of each elongated hole 51b of the base plate 51. Further, the thickness of the large diameter trunk 56a is slightly thicker than that of the base plate 51.

The small diameter trunks 56b are inserted through the through holes 52b of both inertia rings 52 and the through holes 53b and 54b of both lid members 53 and 54. Further, both inertia rings 52 and both lid members 53 and 54 are fixed axially to both sides of the base plate 51 by swaging the heads of the small diameter trunks 56b.

With the construction as described above, the base plate 51 and a unit of the two inertia rings 52 and the two lid members 53 and 54 are rotatable relative to each other as long as each stop pin 56 is movable within each elongated hole 51b of the base plate 51. Further, relative rotation of the base plate 51 and the unit is prevented when the large diameter trunk 56a of each stop pin 56 contacts one end of each elongated hole 51b.

Actions of Torque Converter 1

First, actions of the torque converter body will be briefly explained. In the condition that the front cover 2 and the impeller 3 are rotated, operating oil flows from the impeller 3 to the turbine 4, and torque is transmitted from the impeller 3 to the turbine 4 through the operating oil. The torque transmitted to the turbine 4 is further transmittal to the input shaft (not shown in the drawings) of the transmission through the turbine hub 17.

When the speed ratio of the torque converter 1 increases and the rotation speed of the input shaft reaches a predetermined speed, the operating oil between the front cover 2 and the piston 24 is drained whereas the operating oil is supplied to the turbine-4 side of the piston 24. Accordingly, the piston 24 is moved toward the front cover 2. As a result, the friction member 33 fixed to the piston 24 is pressed onto the front cover 2, and the lock-up device 7 is turned on.

In the clutch-on state as described above, torque is transmitted through a path of the front cover 2, the piston 24, the drive plate 25, the outer peripheral side torsion springs 26, the intermediate member 28, the inner peripheral side torsion springs 29 and the hub flange 30 in this order, and is outputted to the transmission side through the turbine hub 17.

In the lock-up device 7, torque is transmitted and variation in speed of rotation to be inputted thereto from the front cover 2 is absorbed and attenuated. Specifically, when torsional vibrations are generated in the lock-up device 7, the outer peripheral side torsion springs 26 and the inner peripheral side torsion springs 29 are compressed in series between the drive plate 25 and the hub flange 30. Variation in speed of rotation is attenuated by the actions of these torsion springs 26 and 29 and friction resistance (hysteresis torque) of the respective elements.

Actions of Dynamic Damper Device 31

When the outer peripheral side torsion springs 26 are compressed, the circumferentially middle parts thereof deform to bulge radially outward. Further, the outer peripheral side torsion springs 26 attempt to move radially outward due to centrifugal force.

Under the condition as described above, the outer peripheral parts of the respective outer peripheral side torsion springs 26 and the inner peripheral wall of the float member 27 slide against each other, and friction resistance is generated between both elements. Thus, the float member 27 is configured to be dragged and rotated by a rotation angle of roughly half the torsion angle of the outer peripheral side torsion springs 26 in the same direction as the rotation direction of the outer peripheral side torsion springs 26.

The dynamic damper device 31 is mounted to the float member 27. Hence, an inertia element, including the inertia rings 52 and the lid members 53 and 54, is configured to act reversely to a direction of vibrations attributed to variation in speed of rotation. This attenuates variation in speed of rotation to be transmitted to the transmission side through the intermediate member 28 and so forth.

Figure 9:
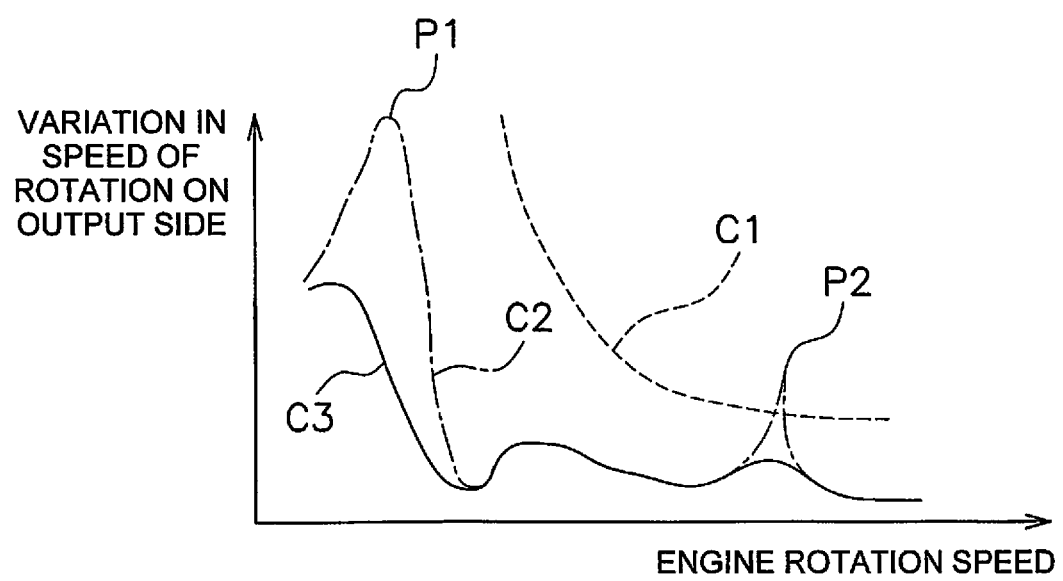
FIG. 9 is a characteristic diagram regarding rotation speed of an engine and variation in speed of rotation on an output side.

FIG. 9 shows the aforementioned advantageous effect of the dynamic damper device 31 in comparison with well-known devices. In FIG. 9, the horizontal axis indicates the rotation speed of the engine, whereas the vertical axis indicates variation in speed of rotation on the output side. Further, a characteristic C1 indicates a characteristic of a well-known lock-up device that is not equipped with a dynamic damper device (e.g., Japan Laid-open Patent Application Publication No. JP-A-20090-293671), characteristic C2 indicates a characteristic of a lock-up device that a dynamic damper device is mounted to an intermediate member thereof (e.g., U.S. Pat. No. 8,135,525), and a characteristic C3 indicates a characteristic of the present exemplary embodiment.

As is obvious from FIG. 9, according to the present exemplary embodiment, a peak P1 of variation in the well-known device can be greatly inhibited especially in a low rotation speed range. Further, a peak P2 of variation in the well-known device can be similarly inhibited in a high rotation speed range. This is due to the construction that the float member 27 is not engaged with the outer peripheral side torsion springs 26 and is rotatable relative to other members, and thereby vibrations of the float member 27 are excluded from a vibration system.

Second Exemplary Embodiment

Figure 10:
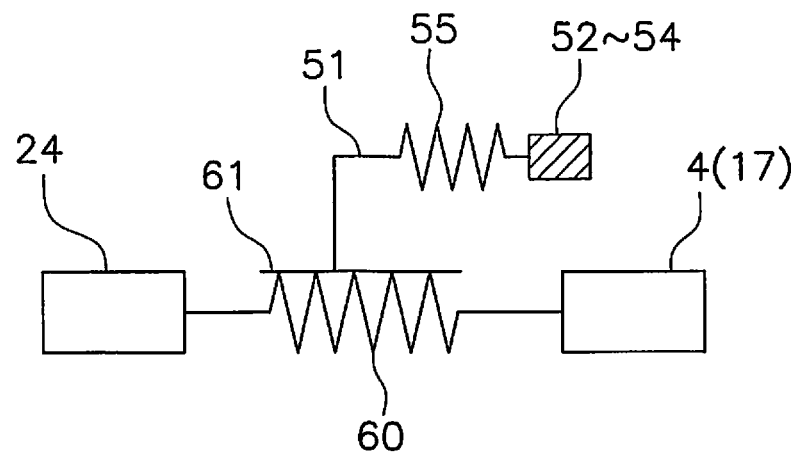
FIG. 10 is a schematic diagram according to a second exemplary embodiment of the present invention.

FIG. 10 shows a schematic diagram of a second exemplary embodiment of the present invention. In the first exemplary embodiment, the outer peripheral side torsion springs and the inner peripheral side torsion springs are provided. By contrast, in the second exemplary embodiment, only one type of the torsion springs is provided.

Specifically, in the second exemplary embodiment, one type of torsion springs 60 is mounted between the piston 24 and the turbine 4 (specifically, the turbine hub 17). Further, a float member 61, having the same construction as the float member 27 of the first exemplary embodiment, is provided for the torsion springs 60. The float member 61 is not engaged with the torsion springs 60, but similarly to the first exemplary embodiment, is allowed to be dragged and rotated by the torsion springs 60 in a predetermined range by friction resistance between the float member 61 and the torsion springs 60.

A dynamic damper device is mounted to the float member 61, and has the same construction as the dynamic damper device 31 of the first exemplary embodiment. Specifically, the present dynamic damper device includes the base plate 51 fixed to the float member 61, the inertia element including the inertia rings 52 and the lid members 53 and 54, and the coil springs 55 functioning as a damper for coupling the base plate 51 and the inertia element.

Third Exemplary Embodiment

Figure 11:
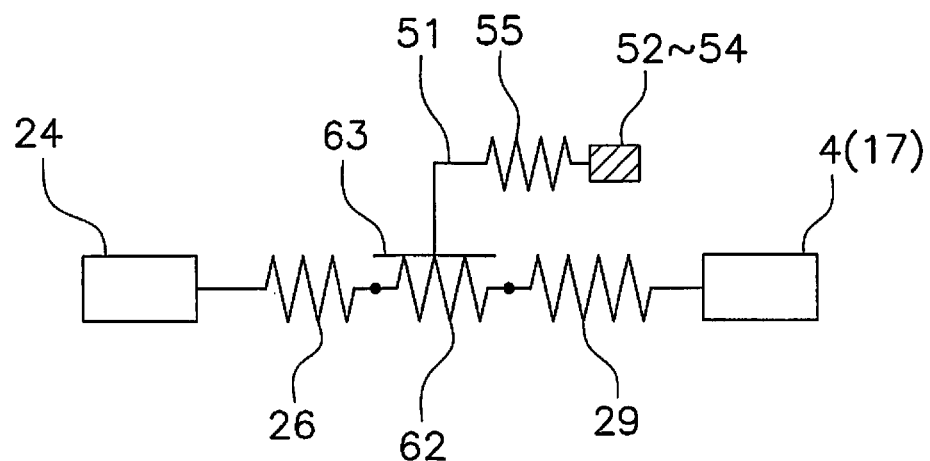
FIG. 11 is a schematic diagram according to a third exemplary embodiment of the present invention.

FIG. 11 shows a schematic diagram of a third exemplary embodiment. In the third exemplary embodiment, intermediate torsion springs 62 are provided in addition to the outer peripheral side torsion springs 26 and the inner peripheral side torsion springs 29. A float member 63 is disposed for accommodating the intermediate torsion springs 62. Similarly to the aforementioned exemplary embodiments, the float member 63 is not engaged with the intermediate torsion springs 62, but is allowed to be dragged and rotated by the intermediate torsion springs 62 in a predetermined range by friction resistance between the float member 63 and the intermediate torsion springs 62.

A dynamic damper device is mounted to the float member 63, and has the same construction as the dynamic damper devices of the first and second exemplary embodiments.

Fourth Exemplary Embodiment

Figure 12:
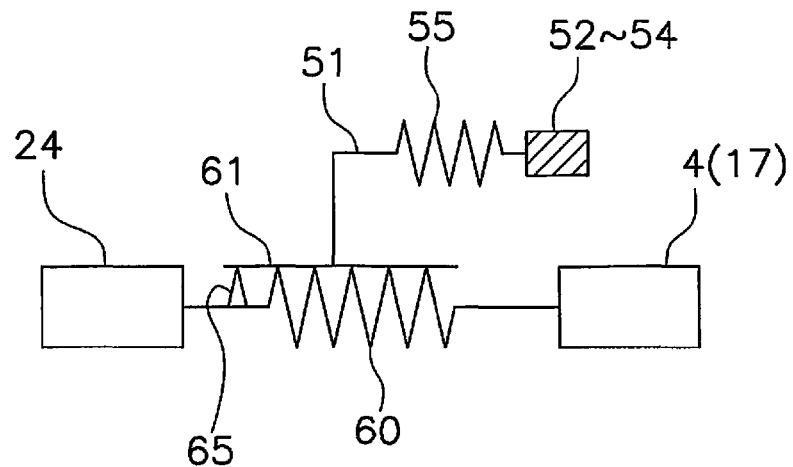
FIG. 12 is a schematic diagram according to a fourth exemplary embodiment of the present invention.

FIG. 12 shows a schematic diagram of a fourth exemplary embodiment. In the fourth exemplary embodiment, a hysteresis torque generating mechanism 65 is further provided between the float member 61 and the input-side rotary member in addition to the construction of the second exemplary embodiment shown in FIG. 10. In the present exemplary embodiment, the hysteresis torque generating mechanism 65 is configured to generate hysteresis torque when the float member 61 is dragged and rotated by the torsion springs 60.

Fifth Exemplary Embodiment

Figure 13:
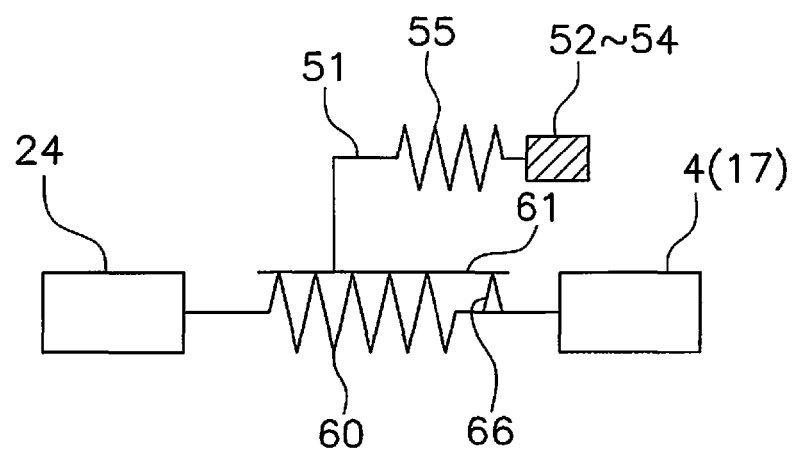
FIG. 13 is a schematic diagram according to a fifth exemplary embodiment of the present invention.

FIG. 13 shows a schematic diagram of a fifth exemplary embodiment. In the fifth exemplary embodiment, a hysteresis torque generating mechanism 66 is further provided between the float member 61 and the output-side rotary member in addition to the construction of the second exemplary embodiment shown in FIG. 10. In the present exemplary embodiment, the hysteresis torque generating mechanism 66 is configured to generate hysteresis torque when the float member 61 is dragged and rotated by the torsion springs 60.

Sixth Exemplary Embodiment

Figure 14:
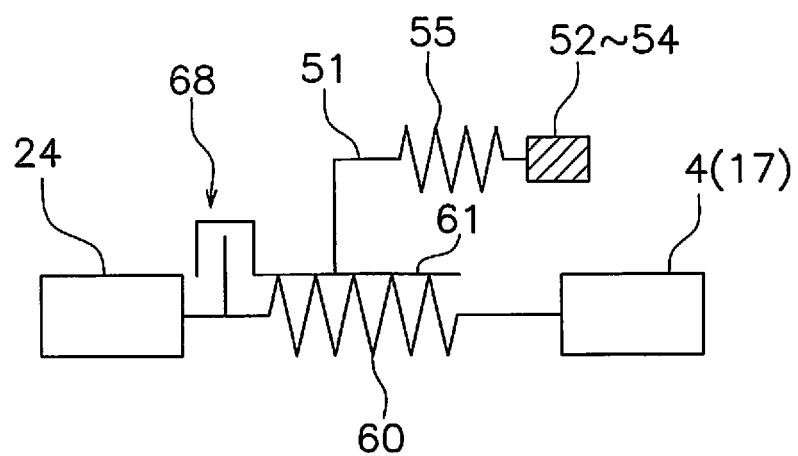
FIG. 14 is a schematic diagram according to a sixth exemplary embodiment of the present invention.

FIG. 14 shows a schematic diagram of a sixth exemplary embodiment. In the sixth exemplary embodiment, a stopper mechanism 68 is further provided between the float member 61 and the input-side rotary member in addition to the construction of the second exemplary embodiment shown in FIG. 10. The stopper mechanism 68 is configured to restrict rotation-directional movement of the float member 61 to a predetermined range.

Seventh Exemplary Embodiment

Figure 15:
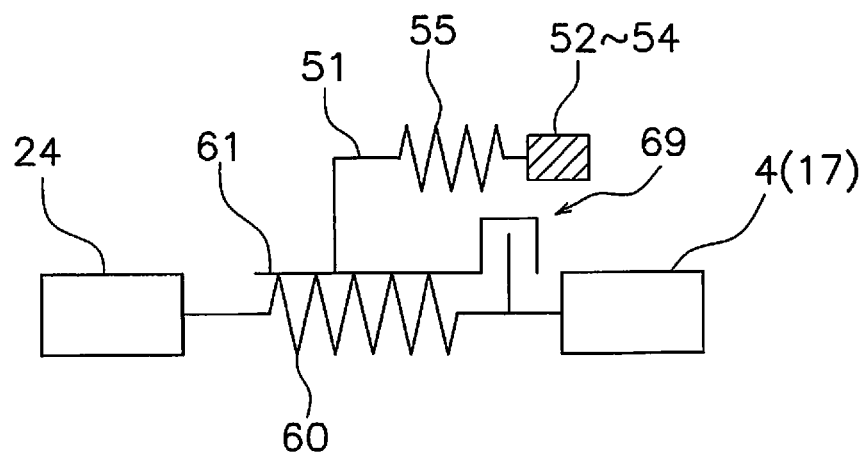
FIG. 15 is a schematic diagram according to a seventh exemplary embodiment of the present invention.

FIG. 15 shows a schematic diagram of a seventh exemplary embodiment. In the seventh exemplary embodiment, a stopper mechanism 69 is further provided between the float member 61 and the output-side rotary member in addition to the construction of the second exemplary embodiment shown in FIG. 10. The stopper mechanism 69 is configured to restrict rotation-directional movement of the float member 61 to a predetermined range.

OTHER EXEMPLARY EMBODIMENTS

The present invention is not limited to the aforementioned exemplary embodiments, and a variety of changes or modifications can be made without departing from the scope of the present invention.

In each of the aforementioned exemplary embodiments, the present invention has been applied to the lock-up device for the torque converter. However, the present invention is similarly applicable to the other types of power transmission devices.

The construction of the dynamic damper device is not limited to that in each of the aforementioned exemplary embodiments, and can be variously changed.

The power transmission device equipped with the damper device according to the exemplary embodiments of the present invention can effectively inhibit variation in speed of rotation to be transmitted to the transmission.

What is claimed is:

1. A power transmission device for transmitting power from an engine to a transmission, comprising:
   an input-side rotary member receiving the power inputted thereto from the engine;
   an output-side rotary member outputting the power to the transmission;
   a first elastic member coupling the input-side rotary member and the output-side rotary member to enable relative rotation between the input-side rotary member and the output-side rotary member;
   a float member rotatable relative to the input-side rotary member, the output-side rotary member and the first elastic member and configured to slide against the first elastic member when rotated, the float member not being disposed in a power transmission path from the engine to the transmission; and a damper device mounted to the float member and including an inertia member, the inertia member being rotatable relative to the float member.

2. The power transmission device according to claim 1, wherein
the first elastic member is a coil spring extending rotation-directionally, and
the float member is contactable to an outer peripheral part of the coil spring and restricts radial movement of the coil spring.

3. The power transmission device according to claim 1, wherein the damper device includes
a base plate fixed to the float member,
the inertia member disposed to be rotatable relative to the base plate, and
a damper coupling the base plate and the inertia member.

4. The power transmission device according to claim 3, wherein
the base plate has an annular shape,
the inertia member includes first and second inertia rings disposed axially on both sides of the base plate, and
the damper includes a coil spring rotation-directionally and elastically coupling the base plate and both of the first and second inertia rings.

5. The power transmission device according to claim 1, wherein
the first elastic member is a coil spring having a circular-arc shape in a free state.

6. The power transmission device according to claim 1, further comprising
at least one of a second elastic member and a third elastic member disposed in series with the first elastic member on at least one of input and output sides of the first elastic member.

7. The power transmission device according to claim 1, further comprising
a friction generating mechanism disposed at least either between the float member and the input-side rotary member or between the float member and the output-side rotary member to generate frictional resistance therebetween.

8. The power transmission device according to claim 1, further comprising
a stopper mechanism for restricting rotation-directional movement of the float member to a predetermined range.

9. The power transmission device according to claim 1, wherein
the first elastic member includes a plurality of outer peripheral side torsion springs engaging the input-side rotary member, and
the power transmission device further comprises
a plurality of inner peripheral side torsion springs disposed on an inner peripheral side of the outer peripheral side torsion springs and engiged with the output-side rotary member, and
an intermediate member disposed to be rotatable relative to the input-side rotary member and the output-side rotary member and coupling the outer peripheral side torsion springs and the inner peripheral side torsion springs.

10. The power transmission device according to claim 1, wherein
frictional engagement between the first elastic member and the float member when the first elastic member moves results in rotation of the float member.

11. A lock-up device for a torque converter disposed between a torque converter body and a front cover coupled to an engine-side member to directly transmit power from the front cover to a turbine of the torque converter body, comprising:
a clutch portion configured to transmit the power from the front cover;
an output flange coupled to the turbine;
a plurality of elastic members configured to transmit the power from the clutch portion to the output flange;
a float member rotatable relative to the clutch portion, the output flange and the elastic members, configured to slide against the elastic members when rotated, and restricting radial movement of the elastic members, the float member not being disposed in a power transmission path from an engine to a transmission; and
a damper device mounted to the float member and including an inertia member, the inertia member being rotatable relative to the float member.

12. The lock-up device according to claim 11, wherein
frictional engagement between the plurality of elastic members and the float member when the plurality of elastic members move results in rotation of the float member.

* * * * *